June 19, 1928. 1,674,215
G. A. MONTGOMERY
BED FOR VEHICLES
Filed March 1, 1926 2 Sheets-Sheet 1
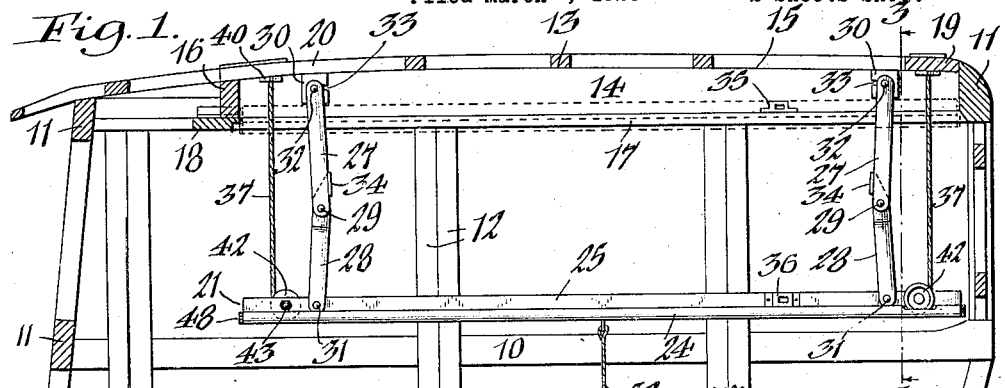
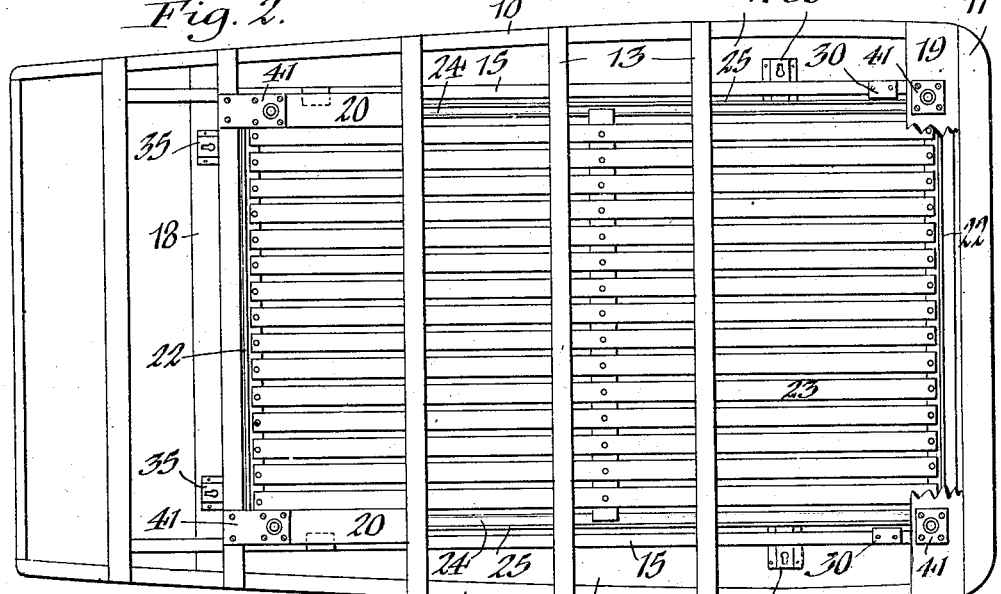
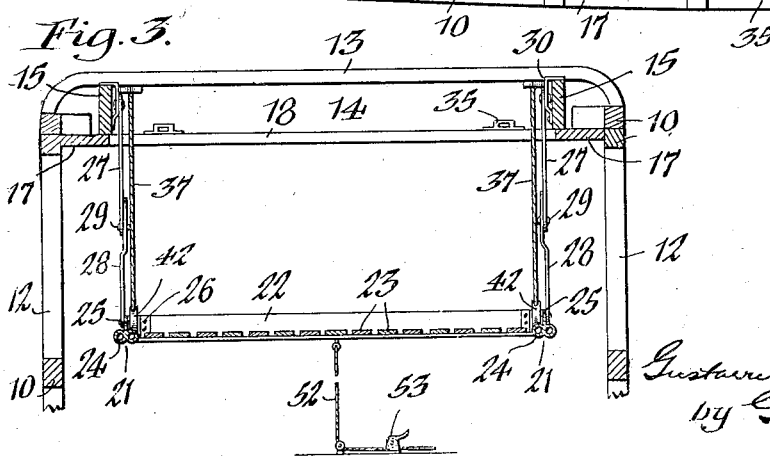
Inventor,
Gustavus A. Montgomery,
by Guyer & Guyer
Attorneys.

June 19, 1928.  1,674,215
G. A. MONTGOMERY
BED FOR VEHICLES
Filed March 1, 1926    2 Sheets-Sheet 2
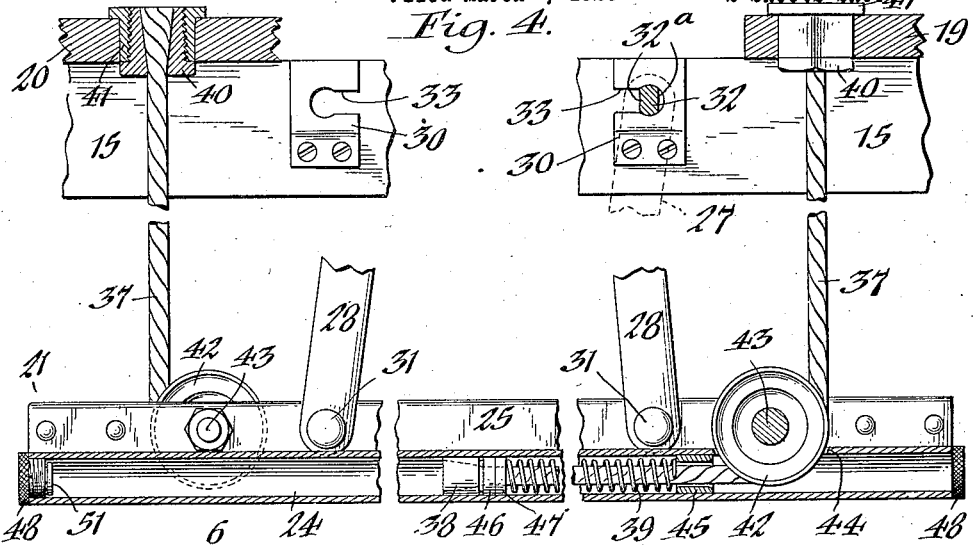
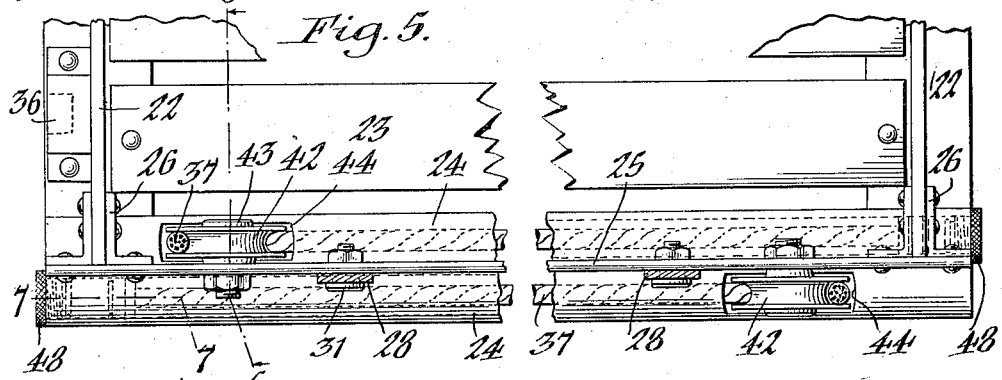
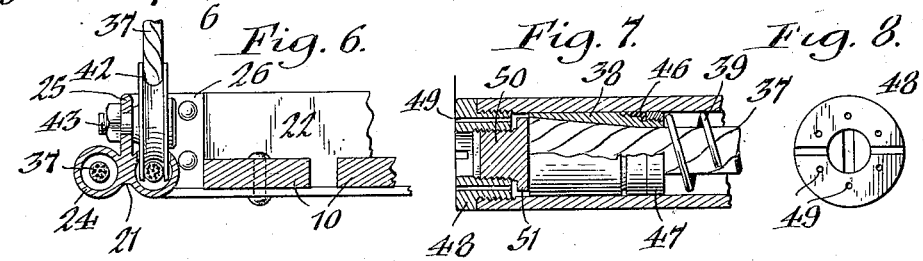
Inventor:
Gustavus A. Montgomery,
by Geyer & Geyer
Attorneys.

Patented June 19, 1928.

1,674,215

UNITED STATES PATENT OFFICE.

GUSTAVUS A. MONTGOMERY, OF TITUSVILLE, PENNSYLVANIA.

BED FOR VEHICLES.

Application filed March 1, 1926. Serial No. 91,339.

This invention relates generally to automobile beds but more particularly to a bed for automobiles of the closed type.

One of its objects is to provide a bed of this character which is displaceable into the roof of the car, where it is concealed and out of the way when not in use, and which can be readily and conveniently lowered to its operative position.

Another object of the invention is to provide foldable means for suspending the bed from the car-roof and automatic means for elevating the same into its concealed position.

A still further object is the provision of an automobile bed which is light, durable and comfortable, which is not liable to get out of order, and which can be manufactured at a moderate cost.

Other features of the invention reside in the novel features of the construction and arrangement of parts hereinafter referred to and particularly pointed out in the appended claims.

In the accompanying drawings: Figure 1 is a fragmentary longitudinal section of the frame-structure of a closed automobile body, showing my invention applied thereto. Figure 2 is a top plan view thereof. Figure 3 is a cross section on line 3—3, Fig. 1. Figure 4 is an enlarged fragmentary sectional elevation of the bed-supporting and elevating means. Figure 5 is an enlarged fragmentary top plan view of the same. Figure 6 is a transverse section on line 6—6, Fig. 5. Figure 7 is a fragmentary longitudinal section on line 7—7, Fig. 5. Figure 8 is an end view of the regulating valve forming a part of the elevating means.

Similar characters of reference indicate corresponding parts throughout the several views.

While the improved bed is adaptable to vehicles of different types, it is shown, by way of example, as applied to an automobile of the closed type, wherein the body-frame structure includes the customary longitudinal side bars 10, transverse end bars 11, uprights 12 and bows 13 of the roof.

In its general organization, the bed comprises a suitable platform, suspended from the car-roof by foldable links, and yieldable means for automatically elevating the bed from its lowered operative position to its elevated inoperative position, the roof of the car being provided with a built-in pocket or compartment for receiving the bed when not in use.

The pocket or compartment 14 for the bed is preferably built into the roof of the car-body so as to occupy substantially the full length and breadth thereof, and is formed by longitudinal side boards 15, 15 suitably fastened to the body-frame and constituting the side walls of the compartment, and a transverse board 16 arranged near the front end of the body and constituting the front wall of the compartment, while the rear wall thereof is formed by the upper transverse end bar 11 of the body-frame. Connecting the bottom edges of the side boards 15, 15 with the side walls of the body-frame are horizontally-disposed boards 17 which serve to close in the spaces formed between such parts, as shown in Fig. 3. In addition to these compartment-forming elements, transverse end boards 18, 19 and comparatively short side boards 20, 20 arranged adjacent the front end of the roof are provided for supporting the various parts of the bed-suspension means, as will hereinafter appear.

The bed-frame is rectangular in shape and composed of longitudinal side members, designated generally by the numeral 21, transverse end members 22, and wooden slats 23 extending lengthwise of the frame and fastened at their ends to said end members. The longitudinal frame members are preferably of the shape shown in cross-section in Fig. 6, and each consists of a pair of tubular sections or pipes 24, 24 arranged side by side, and a vertical web portion 25 disposed between said pipes and rising a suitable distance therefrom. These parts may be welded to form a unitary structure or they may be cast in one piece from aluminum or other light weight metal. The transverse end members are in the form of T-bars and the ends of their web portions are connected to the adjoining ends of the webs 25 of the side members by corner braces 26, thus producing a strong and durable bed-frame structure. In its elevated position, the bed fits snugly in the roof-compartment 14 and its bottom side may be covered with upholstery to match the inside trim of the car.

The bed is suspended from the car-roof for bodily movement in a vertical path into and out of the compartment 14 and for this purpose two sets of foldable links or suspension arms 27, 28 are attached to its opposite ends, the inner or adjoining ends of each set of arms being pivoted to each other, as shown at 29 in Fig. 1. The free end of the upper arm of each set is pivoted to a hanger or bracket 30 fastened to the corresponding side board 15, while the free end of the lower arm of each set is pivoted at 31 to the web 25 of the corresponding longitudinal side member of the bed-frame. The upper arms are preferably detachably connected to their hangers 30 and for this purpose each has a headed fulcrum pin 32 with flattened sides 32ᵃ fitted in a key-hole shaped notch 33 in the side wall of the respective hanger. By swinging these arms to a substantially horizontal position, they can be readily detached from their hangers, thereby enabling the bed to be wholly removed from the car by simply opening the windshield and withdrawing it through the front of the car-body. For the purpose of limiting the unfolding of the suspension arms to slightly less than a straight line, each of the lower arms 28 has an offset stop-flange 34 above its pivot 29 adapted to abut against the adjacent edge of the companion upper link 27, as shown in Fig. 1. This arrangement insures the suspension arms folding inwardly within the roof-compartment 14 when the bed is elevated.

Suitable fasteners may be provided for holding the bed firmly in its elevated inoperative position. For example, as shown in Figs. 1, 2, 3 and 5, the opposite side boards 15, 15 and the front transverse board 18 are provided with key-operated locks 35 or similar devices and the side and front end bed-frame members 21 and 22 are provided with the companion or mating members 36 of such locks.

Means are provided for automatically elevating the bed to its inoperative position, and as shown in the drawings, these means preferably consist of four suspension cables 37, one arranged near each set of the foldable arms, attached at their upper ends to the car-roof while their opposite ends are tightly fitted in plungers 38 guided in the tubular sections 24 of the bed-frame which also constitute air cylinders, and coil springs 39 housed in said tubular sections and surrounding said cables for constantly exerting a lifting effort on the bed. The opposing cables at each side of the bed-frame extend into the companion tubular sections of the side members 21 from opposite ends thereof, so that a single cable is operating in each tubular section 24 with their plungers moving in reverse directions as the bed is raised and lowered into and out of its roof-compartment 14. The upper end of each cable is anchored in an externally-threaded plug 40 fitted in an internally-threaded flanged nut or sleeve 41 fastened to the transverse rear end board 19 or one of the side boards 20, as the case may be. Pulleys 42 mounted on bolts 43 extending through the webs of the side members 21 of the bed frame serve to guide the cables into the tubular sections of said members, so that as the bed is raised and lowered the cables are correspondingly drawn into and out of their housings to shorten or lengthen the suspending stretches of the cables. As shown in Figs. 4 and 5, the lower portions of the pulleys extend through slots 44 in the upper sides of said tubular sections. Each spring 39 bears at one end against the corresponding plunger 38 and at its opposite end against a sleeve 45 fitted in that end of each tubular section 24 adjacent the guide pulley 42. The plungers may be provided with leather-cup packings 46 held thereon by retaining nuts 47.

As the plungers are reciprocated in the tubular sections or cylinders 24 during the lowering and raising movements of the bed, air is admitted to and expelled from said cylinders through controlling valves located in the working ends thereof, or in those ends opposite their corresponding pulleys 42. In the preferred construction shown in Figs. 7 and 8, each of these valves comprises a sleeve 48 screwed or otherwise fitted in the end of the respective cylinder and having an annular row of small ports 49 therein through which air is admitted to or expelled from said cylinder. The bore of this sleeve is threaded at its inner end to receive an adjustable plug 50 having a flanged head 51 adapted to extend over the inner ends of the ports 49. By adjusting this flanged-plug toward and from the inner face of the ported-sleeve, the flow of air into and out of the cylinder is correspondingly regulated, the head of said plug also acting as a stop against which the plunger abuts in the elevated position of the bed, as shown in Fig. 7.

By suspending the bed from the roof of the car in the manner described, it can be easily and conveniently lowered into position for use, and it can be automatically elevated to its concealed inoperative position, the air-control valves 50, 51 properly retarding the action of the springs 39 during this time. In its lowered position, the weight of the bed is on the foldable arms 27, 28 and the same is intended to assume a position slightly above the tops of the seat-backs.

For the purpose of conveniently pulling the bed down for use, a cord 52 may be fastened at one end thereto, while its other end may be removably held in a cam fastener 53 or equivalent device secured to the floor of the car. By this arrangement, the bed may be held at any vertical level desired.

I claim as my invention:

1. The combination with an automobile having a compartment in the interior of its roof, of foldable suspension means depending from the roof, a bed-frame attached to the lower ends of said suspension means and movable into and out of said compartment, said bed-frame including members constituting housings, and auxiliary suspension means applied to and partially contained within the bed-frame housing members for resisting the unfolding movements of said foldable suspension means.

2. The combination with an automobile having a compartment in the interior of its roof, of foldable suspension means depending from the roof, a bed-frame attached to the lower ends of said suspension means and movable into and out of said compartment, and flexible connections fixed at one end to the automobile roof and movably connected at their opposite ends to said bed-frame, the latter including side members constructed to house the last-named ends of said flexible connections.

3. The combination with an automobile having a compartment in the interior of its roof, of foldable suspension means depending from the roof, a bed-frame attached to the lower ends of said suspension means and movable into and out of said compartment, said bed-frame including tubular side members, and flexible suspension members depending from opposite ends of the automobile roof and extending into said tubular side members for movement lengthwise thereof in response to the raising and lowering movement of the bed-frame.

4. The combination with an automobile having a compartment in the interior of its roof, of foldable suspension means depending from the roof, a bed-frame attached to the lower ends of said suspension means and movable into and out of said compartment, said bed-frame including tubular side members, flexible suspension members depending from opposite ends of the automobile roof and extending into said tubular side members for movement lengthwise thereof in response to the raising and lowering movements of the bed-frame, and means applied to said flexible suspension members and contained in the corresponding tubular side members for restraining the movement of the bed-frame in one direction.

5. The combination with an automobile having a compartment in the interior of its roof, of foldable suspension means depending from the roof, a bed-frame attached to the lower ends of said suspension means and movable into and out of said compartment, said bed-frame including tubular side members, flexible suspension members depending from opposite ends of the automobile roof and extending into said tubular side members for movement lengthwise thereof in response to the raising and lowering movements of the bed-frame, the free ends of said flexible suspension members terminating in plungers guided in said tubular members, and coil springs applied to the flexible members and each bearing at one end against the corresponding plunger for resisting downward movement of the bed-frame.

6. The combination with an automobile body, of collapsible suspension means depending from the roof of said body, a bed-frame connected to the lower ends of said suspension means and movable to an inoperative position against the roof, said bed-frame including tubular side members and guide pulleys mounted thereon near the ends thereof, and cables depending from the roof and passing around said pulleys into the corresponding tubular side members for movement into and out of the same as the bed-frame is raised and lowered, the free ends of said cables having plungers thereon guided in said tubular side members.

7. The combination with an automobile body, of collapsible suspension means depending from the roof of said body, a bed-frame connected to the lower ends of said suspension means and movable to an inoperative position against the roof, said bed-frame including tubular side members and guide pulleys mounted thereon near the ends thereof, cables depending from the roof and passing around said pulleys into the corresponding tubular side members for movement into and out of the same as the bed-frame is raised and lowered, the free ends of said cables having plungers thereon guided in said tubular side members, and coil springs surrounding those portions of the cables contained in said side members and each bearing at one end against the respective cable-plunger, said springs acting to lift the bed-frame to its elevated position.

8. The combination with an automobile body, of collapsible suspension means depending from the roof of said body, a bed-frame connected to the lower ends of said suspension means and movable to an inoperative position against the roof, said bed-frame including tubular side members and guide pulleys mounted thereon near the ends thereof, cables depending from the roof and passing around said pulleys into the corresponding tubular side members for movement into and out of the same as the bed-frame is raised and lowered, the free ends of said cables having plungers thereon guided in said tubular side members, coil springs surrounding those portions of the cables contained in said side members and each bearing at one end against the respective cable-plunger, said springs acting to lift the bed-frame to its elevated position, and valves in the ends of said tubular side members for controlling the admission and expulsion of air to and from the same in response to the movements of the plungers therein.

9. The combination with an automobile body, of collapsible suspension means depending from the roof of said body, a bed-frame connected to the lower ends of said suspension means and movable to an inoperative position against the roof, said bed-frame including side members each consisting of a pair of tubular sections disposed side by side and an intermediate web portion, a pulley mounted near the end of one section and on the opposite end of the companion section, cables depending from opposite ends of the roof and passing around the corresponding pulleys into said tubular sections, plungers attached to the free ends of said cables and guided in the tubular sections for movement lengthwise thereof in response to the raising and lowering movements of the bed-frame, coil springs surrounding those portions of the cables contained in said tubular sections and bearing at one end against the corresponding plungers, and valves in the ends of said tubular sections opposite to those containing the pulleys for controlling the admission and expulsion of air to and from the same.

10. The combination with an automobile body, of collapsible suspension means depending from the roof of said body, a bed-frame connected to the lower ends of said suspension means and movable to an inoperative position against the roof, said bed-frame including tubular side members and guide pulleys mounted thereon near the ends thereof, cables depending from the roof and passing around said pulleys into the corresponding tubular side members for movement into and out of the same as the bed-frame is raised and lowered, the free ends of said cables having plungers thereon guided in said tubular side members, coil springs surrounding those portions of the cables contained in said side members and each bearing at one end against the respective cable-plunger, said springs acting to lift the bed-frame to its elevated position, and valves in the ends of said tubular side members for controlling the admission and expulsion of air to and from the same in response to the movements of the plungers therein, each of said valves including a sleeve fitted in the end of the corresponding tubular side member and having a series of ports opening into the latter, and an adjustable plug engaging the inner end of the sleeve-bore and having an annular flange arranger to extend over said ports.

11. An automobile bed, comprising a bed-frame including tubular side members and foldable arms at its opposite sides adapted for suspension from the automobile roof, and flexible members yieldingly guided at one end in the side members of said bed-frame and adapted for connection at their opposite ends to said roof.

12. An automobile bed, comprising a bed-frame including tublar side members and foldable arms at the opposite ends thereof adapted for suspension from an automobile roof, flexible members having plungers attached at one end thereto and guided in said tubular side members, the opposite ends of said members being adapted for attachment to said roof, and springs applied to those portions of the flexible members contained in said tubular side members for urging the bed-frame to its elevated position.

13. An automobile bed, comprising a bed-frame including tubular side members and foldable arms at the opposite ends thereof adapted for suspension from an automobile roof, flexible members having plungers attached at one end thereto and guided in said tubular side members, the opposite ends of said members being adapted for attachment to said roof, yieldable means for urging said plungers in a direction to lift the bed-frame, and valves in the ends of said tubular members for controlling the admission and expulsion of air to and from the same in response to the movements of the plungers therein.

GUSTAVUS A. MONTGOMERY.